US011799649B2

United States Patent
Zach et al.

(10) Patent No.: US 11,799,649 B2
(45) Date of Patent: Oct. 24, 2023

(54) TAMPER-PROOF DATA PROCESSING DEVICE

(71) Applicant: MUSE Electronics GmbH, Vienna (AT)

(72) Inventors: Gerald Zach, Obersdorf (AT); Philipp Lechner, Vienna (AT)

(73) Assignee: MUSE Electronics GmbH, Vienna (AT)

( * ) Notice: Subject to any disclaimer, the term of this patent is extended or adjusted under 35 U.S.C. 154(b) by 346 days.

(21) Appl. No.: 17/422,355

(22) PCT Filed: Jan. 10, 2020

(86) PCT No.: PCT/EP2020/050504
§ 371 (c)(1),
(2) Date: Jul. 12, 2021

(87) PCT Pub. No.: WO2020/148176
PCT Pub. Date: Jul. 23, 2020

(65) Prior Publication Data
US 2022/0021531 A1    Jan. 20, 2022

(30) Foreign Application Priority Data

Jan. 14, 2019 (EP) .................................. 19151564

(51) Int. Cl.
*H04L 9/14* (2006.01)
*G06F 21/86* (2013.01)
*G06F 1/30* (2006.01)

(52) U.S. Cl.
CPC .................. *H04L 9/14* (2013.01); *G06F 1/30* (2013.01); *G06F 21/86* (2013.01)

(58) Field of Classification Search
CPC ... H04L 9/14; G06F 1/30; G06F 21/82; G06F 21/85; G06F 21/86; G06F 21/87
See application file for complete search history.

(56) References Cited

U.S. PATENT DOCUMENTS

| 6,351,817 B1 | 2/2002 | Flyntz |
| 7,526,785 B1 * | 4/2009 | Pearson .................. G06F 21/85 725/31 |

(Continued)

FOREIGN PATENT DOCUMENTS

| EP | 1418504 A2 | 5/2004 |
| WO | 2012161505 A1 | 11/2012 |
| WO | 2013144416 A1 | 10/2013 |

OTHER PUBLICATIONS

PCT International Preliminary Report on Patentability and Written Opinion from corresponding International Application No. PCT/EP2020/050504 dated Jun. 16, 2021.

(Continued)

*Primary Examiner* — Hosuk Song
(74) *Attorney, Agent, or Firm* — Hoffmann & Baron, LLP

(57) ABSTRACT

A data processing device having a housing in which are arranged a processor, a program memory connected to the processor and at least one hardware component connected to the processor via a data line and supplied with power via a power supply line, comprises a microcontroller arranged in the housing and having an interface and a persistent key memory in which the public key of a first public/private key pair is stored, wherein a switch controlled by the microcontroller is interposed in the data line, and wherein the microcontroller is configured to receive a signature, generated using the private key of the first key pair, of a memory module detachably connected to the interface via the interface, to verify the signature using the public key of the first key pair, and to switch on the switch in the case of verification.

15 Claims, 2 Drawing Sheets

(56) References Cited

U.S. PATENT DOCUMENTS

| | | | | |
|---|---|---|---|---|
| 8,699,705 | B2* | 4/2014 | Spalka | H04L 9/3073 |
| | | | | 380/44 |
| 9,055,052 | B2* | 6/2015 | Mane | H04L 63/0869 |
| 9,124,433 | B2* | 9/2015 | Marien | H04L 9/3228 |
| 9,830,479 | B2* | 11/2017 | Soja | G06F 21/82 |
| 10,481,900 | B2* | 11/2019 | Haase | H04L 9/3247 |
| 11,609,997 | B2* | 3/2023 | Tsai | G06F 21/74 |
| 2004/0098604 | A1 | 5/2004 | Noldge | |
| 2015/0186684 | A1 | 7/2015 | Wang et al. | |
| 2018/0246839 | A1 | 8/2018 | Nevalainen | |

OTHER PUBLICATIONS

Indian Search Report corresponding to Application No. 202117030261, dated Jan. 30, 2023.
International Search Report and Opinion from priority International Application No. PCT/EP2020/050504, dated Mar. 23, 2020.
European Search Report for priority application No. 19151564.2-1218, dated Jul. 1, 2019.

* cited by examiner

TAMPER-PROOF DATA PROCESSING DEVICE

CROSS-REFERENCE TO RELATED APPLICATIONS

This application is a National Phase application of International Application No. PCT/EP2020/050504 filed Jan. 10, 2020 which claims priority to the European Patent Application No. 19 151 564.2 filed Jan. 14, 2019, the disclosures of which are incorporated herein by reference.

TECHNICAL FIELD

The disclosed subject matter relates to a data processing device comprising a housing in which are arranged a processor, a program memory connected to the processor and at least one hardware component connected to the processor via a data line and supplied with power via a power supply line.

BACKGROUND.

US 2015/0186684 A1 describes a power supply for a data processing device. The power supply has a receiver for connecting an electronic tag with an authorization code. The receiver compares the authorization code received from the tag with a specified code and, in the event of verification, switches on the power supply to the device via a transistor switch.

The protection of data processing equipment against tampering and hacker attacks is of strategic importance for security-critical applications, particularly in the official and industrial sector. Tremendous efforts are made to safeguard devices by means of physical access barriers and software firewalls. Particularly, the protection of mobile data processing devices in the field having standard operating systems and applications is a major problem due to easy physical access to said devices, their mostly open interfaces and the widespread use of malware for such devices.

BRIEF SUMMARY

The disclosed subject matter has the goal of creating a data processing device of the type mentioned at the beginning with improved security, particularly for mobile use in the field.

This goal is achieved with a data processing device, comprising a housing in which are arranged a processor, a program memory connected to the processor via a data line and supplied with power via a power supply, and a microcontroller arranged in the housing and having an interface and a persistent key memory in which the public key of a first public/private key pair is stored, wherein a switch controlled by the microcontroller is interposed in the data line of said at least one hardware component, and wherein the microcontroller is configured to receive a signature, generated using the private key of the first key pair, of a memory module detachably connected to the interface via the interface, to verify the signature using the public key of the first key pair, and to switch on the switch in the case of verification.

The disclosed subject matter creates a completely novel security concept for a data processing device. The security concept consists of a combination of device-internal switches for switching hardware components on and off and a software authentication of an externally connectable memory module, which serves as a "key" for the proper start-up of the device. For this purpose, a separate microcontroller is arranged in the housing, which microcontroller acts as a "security gateway" for the start-up of the hardware components by handling the authentication of the external memory module and depending thereon, operates the hardware switches. Since the data processing device cannot be operated without a correspondingly authenticated memory module, the risk of tampering with the data processing device is reduced.

In the present disclosure, the term "memory module" is understood to mean any type of hardware component which is capable of sending said signature to the data processing device via the interface. The memory module can either contain said signature already precalculated or only said private key in order to generate the signature from it, if necessary. For example, the memory module, particularly in the first case, is a mere memory such as a semiconductor memory card, a memory stick or chip, an RFID or NFC tag or the like, or, particularly in the second case, also equipped with its own computing power, for example, a SIM card, a cryptographic dongle, a smartphone or the like.

The hardware component/s of the data processing device connected in this way can be of any type. Examples include a wired or wireless interface module, for example, a USB port, a memory card interface, a wireless interface, such as a WiFi®, Bluetooth® or cellular network module, an input and/or output device such as a keyboard, a screen or touch screen, a camera or any other type of environmental sensor. One of the connected hardware components can particularly also be a persistent, that is, non-volatile, mass storage device, for example, a magnetic hard disk or an optical disk, in contrast to the program memory of the processor, which is, e.g., a volatile memory. Without a memory module authenticated by the microcontroller, the data processing device therefore thus has no mass storage device with the operating system and application programs stored therein, that is, it is "empty", as it were. Only when the correct memory module is connected are the corresponding hardware components, for example, the persistent mass storage device with the programs and the necessary interfaces, cameras, sensors, etc., available and the device ready for use. Different hardware components can be activated depending on the connected memory module.

In addition to the switch that connects the data line of the respective hardware component, a further switch controlled by the microcontroller can be interposed in the power supply line of the respective hardware component and the microcontroller can also be configured to switch on said further switch in the case of verification in order to increase security.

In a further embodiment of the diclosed subject matter, the microcontroller can be configured to load a program and/or data from the memory module via the interface in the case of verification. The data processing device can thus be distributed without any persistent mass storage device, for example. The system programs, applications and data required for operation can be distributed to the users on the certified memory module; only when the respective memory module authenticated with respect to the data processing device is connected is the data processing device loaded with the programs and data and can be put into operation.

The private key of a second public/private key pair is optionally stored in the key memory and the microcontroller is configured to load a program encrypted with the public key of the second key pair or data encrypted in this way via the interface, to decrypt the program or data, respectively, using the private key of the second key pair, and to supply the program or data, respectively, to the processor for storage in the program memory or the hardware component. The data transfer of the program from the memory module to the data processing device is encrypted and immune to eavesdropping attacks on the interface.

The key memory in which the public key of the external memory module is stored can, for example, be located directly in the microcontroller or in a memory connected thereto. Alternatively, the key memory can also be located in a Trusted Platform Module (TPM) that is connected to the microcontroller. In a further advantageous embodiment of the disclosed subject matter, such a TPM can be used to store the public key of a public/private key master key pair therein, wherein the microcontroller is then configured to receive a public key signed using the private key of the master key pair via the interface, to verify the signature thereof using the public key of the master key pair and, in the case of verification, to store the received public key in the key memory. An administrator who has the private key of the master key pair can, for example, store application or mission-specific public keys using an administrator terminal connected to the interface and thus prepare the data processing device for users with correspondingly application or mission-specific authorized memory modules.

The interface, which is used to connect the external memory module or the optional administrator terminal, can be either wirebound or wireless, for example, a short-range radio interface based on RFID (radio frequency identification), WLAN (wireless local area network), NFC (near field communication) or Bluetooth® standard. The interface may be wirebound, e.g., a USB interface in order to ensure physical assignment security.

According to a further optional feature of the disclosed subject matter, the housing is equipped with a tampering sensor connected to the microcontroller and the microcontroller is configured to switch off the switch or switches when the tampering sensor activates. Such a tampering sensor can, for example, monitor the integrity of the housing and respond to the housing being opened or damaged, in order then to deactivate one or more hardware components. In this case, when the tampering sensor activates, the microcontroller can optionally also clear the key memory in order to prevent any further start-up even when the memory module is reconnected.

Alternatively or additionally, the data processing device can be equipped with a power failure detector connected to the microcontroller and the microcontroller can be configured to clear the key memory when the power failure detector activates. Further operation of the device can thus be prevented even if the power supply is tampered with. In the embodiment having a Trusted Platform Module, the microcontroller can further delete the public key of the master key pair in the Trusted Platform Module when the power failure detector activates. Without a master public key, memory module-specific public keys can no longer be stored, so that the device is permanently unusable after a power failure has been detected.

BRIEF DESCRIPTION OF THE DRAWINGS

The disclosed subject matter is explained in more detail below with reference to the embodiments shown in the accompanying drawings. The drawings show.

Figure 1:
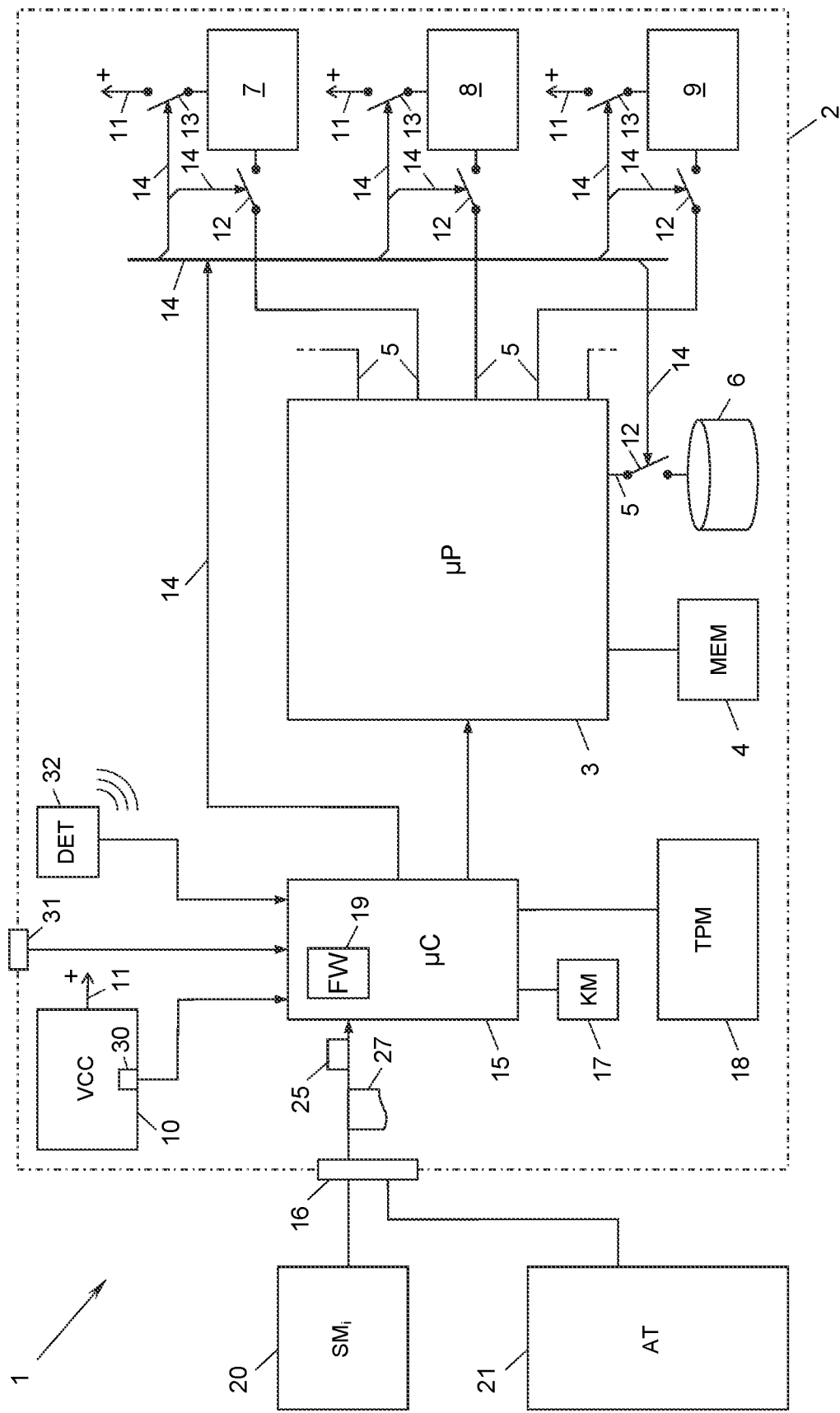
FIG. 1 a block diagram of the data processing device of the disclosed subject matter in connection with a memory module and an administrator terminal.

According to FIG. 1, a data processing device 1 comprises a housing 2 (only depicted schematically here) for the secure and protected accommodation of the components arranged therein. The data processing device 1 is, for example, a desktop, laptop, notebook, handheld or tablet computer or a smartphone. The housing 2 is highly robust and optionally secured in such a way that access to the components of the data processing device 1 inside the housing is as difficult as possible. The housing 2 can be splash-proof or watertight, protected against irradiation and radiation, protected against heat, shock and impact, bulletproof and explosion-proof, etc.

A processor 3 having a volatile program memory 4 connected thereto and one or more hardware components 6-9 connected to the processor 3 via data lines 5 are arranged in the housing 2, on one or more circuit boards with corresponding connecting lines. All components of the data processing device 1 are supplied with power from a power supply 10 internal or external to the housing, including the hardware components 6-9, via exemplary power supply lines 11.

Each of the (here, as an example: four) hardware components 6-9 can particularly be: a persistent, that is, non-volatile, mass storage device, for example, a magnetic hard disk, an optical storage disk, a flash memory, a ROM, PROM, EPROM, EEPROM etc.; a wirebound interface module, for example, a USB, Firewire® or HDMI interface or a memory card interface, for example, for SD memory cards; a radio interface module, for example, a WiFi®, Bluetooth®, NFC or RFID module or a cellular network module according to a 2G, 3G, 4G or 5G standard such as GSM, UMTS, LTE, 5G or the like; a camera or any other environmental sensor, for example, a temperature, sound or light sensor for temperature, light and sound inside and/or outside the housing 2; a chemical sensor, air quality sensor, sensor for detecting radioactivity, rangefinder, multimeter, data logger or the like; an input and/or output unit such as a keyboard, a screen, a touchscreen or the like; a satellite navigation receiver, for example, a GPS, Galileo or Glonass receiver; a position or acceleration measuring device or an IMU (inertial measurement unit); an audio module for sound or speech input and output.

A controllable switch 12 is interposed in each of the data lines 5 of the hardware components 6-9. Likewise, a controllable switch 13 is interposed in each of the power supply lines 11 of the hardware components 6-9. The switches 12, 13 are controlled by a microcontroller 15 in the housing 2 via control lines 14.

The microcontroller 15 has an interface 16 from the housing 2 to the outside. The interface 16 can be either wirebound or wireless, for example, said interface is a USB interface, a short range radio interface according to an RFID, WLAN, NFC or Bluetooth® standard, or the like. However, the interface 16 could also be formed by a hardware component 6-9 designed as an interface module, if desired.

A persistent key memory 17 and a Trusted Platform Module 18, the function of which will be explained in more detail later, are connected to the microcontroller 15. The key memory 17 could also be located directly in the microcontroller 15, as could the Trusted Platform Module 18 or, viewed conversely, the microcontroller 15 could be formed by a processor element in the Trusted Platform Module 18.

The microcontroller 15 is programmed with firmware 19 which is stored in a persistent memory area inside the microcontroller 15, in the key memory 17 and/or in the Trusted Platform Module 18 and allows the microcontroller 15 to perform the functions described below.

A memory module 20 is detachably connected to the interface 16. Alternatively or in addition, an administrator terminal 21 can also be connected via the interface 16 for configuring, particularly, the microcontroller 15, the key memory 17 and/or the Trusted Platform Module 18.

The memory module 20 is, for example, a "pure" memory such as a semiconductor memory card, for example, a USB memory stick, an SD memory card, an RFID or NFC tag or the like, or it is also equipped with its own processing power, that is, in addition to its memory, also has its own processor, such as a SIM card, a cryptographic dongle, a smartphone, a PDA (personal digital assistant), a "wearable" such as a digital bracelet, a smart watch or generally any type of digital device, that can be worn on or even in the body of the user.

Figure 2:
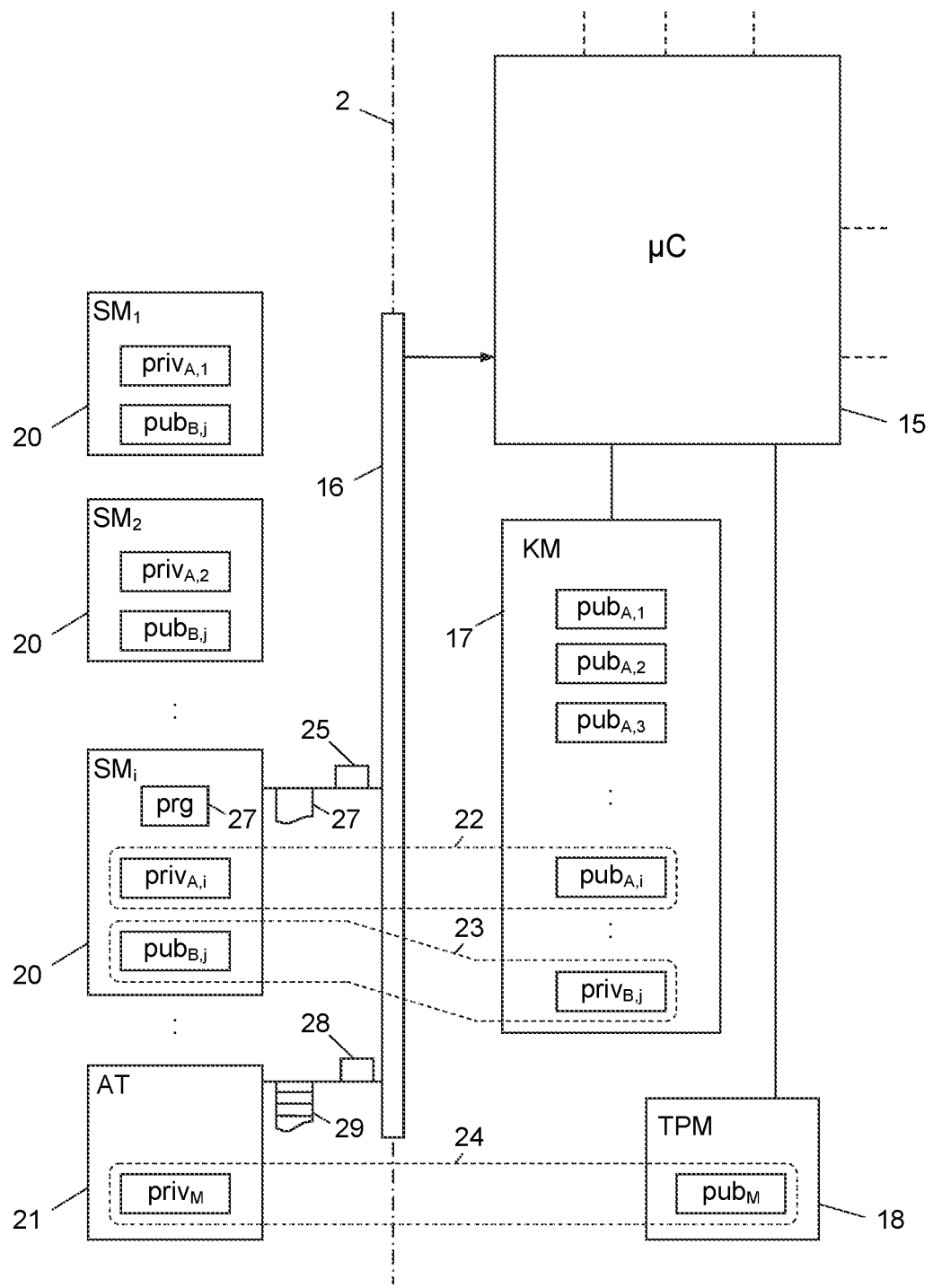
FIG. 2 a detail of the circuit diagram from FIG. 1.

FIG. 2 shows the storage of various key pairs 22 - 24 in the components described above. Each key pair 22 - 24 consists of a private key "priv" and a public key "pub". As is known in the art, data of a communication participant A, which said participant has signed using his private key privA, can be authenticated by another participant B by recalculating the signature with the aid of public key pubA of participant A, that is, be checked for actual signing using the private key privA; and if participant A has encrypted data with the public key pubB of participant B, said encrypted data can be decrypted by participant B with his private key privB.

With such a public/private key encryption method, the most varied of memory modules 20 from a set of memory modules $SM_1$, $SM_2$, ..., generally $SM_i$, can be authenticated with respect to the data processing device 2. First, the public key $pub_{A,i}$ of the memory module $SM_i$ is stored in the key memory 17 of the microcontroller 15, for example, during the production, initialization and/or distribution of the data processing device 1 to a user in the field. The memory module $SM_i$ itself contains the associated private key $priv_{A,i}$; the public key $pub_{A,i}$ and the private key $priv_{A,i}$ form a first key pair 22.

The microcontroller 15 is thus able to authenticate the memory module 20 or $SM_i$ when it is connected, that is, to check its authorization for the operation of the data processing device 1. For this purpose, the microcontroller 19 receives a signature 25 of the memory module $SM_i$ generated by the memory module $SM_i$ using the private key $priv_{A,i}$ via the interface 16 and verifies said signature with the public key $pub_{A,i}$ stored in the key memory 17. In the case of verification, that is, if the verification is successful, the microcontroller 15 switches the switches 12, 13 on; if the verification fails, it switches the switches 12, 13 off.

Naturally, a hardware component 6-9 does not necessarily have to have both switches 12, 13. For example, only its data line 5 could be connected via a switch 12, or only its power supply line 11 could be connected via a switch 13. When a hardware component 6-9 has both a data switch 12 and a power switch 13, both switches 12, 13 are generally, although not necessarily, switched on or off together.

A specific subgroup of all available hardware components 6-9 can be associated with a specific memory module $SM_i$, which specific subgroup is switched on by the microcontroller 15 in the case of verification. The hardware components 6-9 to be switched on can then be selected by corresponding identification of that public key $pub_{A,i}$, the verification of which was successful and to which a list of hardware components 6-9 is associated in the key memory 17, for example. Alternatively, the memory module $SM_i$ could also send a list of the hardware components 6-9 to be switched on with the signature 25.

Optionally, the microcontroller 15 continuously checks the presence of the connected memory module 20 or the interface 16 detects a removal or failure of the memory module 20 in order to immediately switch off the hardware components 6-9 that were previously switched on.

Programs or data 27, for example, the operating system of the data processing device 1, operating data and/or applications, can optionally be stored in one or more of the memory modules $SM_i$. In the case of verification, the microcontroller 15 can then load the program or the data 27 from the memory module 20 via the interface 16 and supply it to the processor 3, for example, for storage in the program memory 4 or a hardware component 6-9, for example, the mass storage device 6.

When the program or the data 27 is transmitted via the interface 16, said program or data can be encrypted with the aid of a second public/private key pair 23 composed of a public key $pub_{B,j}$ and a private key $priv_{B,j}$. For this purpose, the private key $priv_{B,j}$ of the second key pair 23 is stored in the key memory 17 of the microcontroller 15 and the public key $pub_{B,j}$ of the second key pair 23 is stored in the memory module 20. The memory module 20 can now encrypt the program or the data 27 using the public key $pub_{B,j}$ of the data processing device 1 and send the program or the data 27 via the interface 16, and the microcontroller 15 can decrypt the encrypted program or the data 27 encrypted in this way using the private key $priv_{B,j}$ stored in the key memory 17.

If necessary, a plurality of different second key pairs 23 can also be used, that is, a plurality of private keys $priv_{B,1}$, $priv_{B,2}$, ..., $priv_{B,j}$ can be stored in the key memory 17 in order to decrypt different programs or data 27 encrypted with the respective associated public key $pub_{B,j}$, $pub_{B,j}$ ... $pub_{B,j}$.

Optionally, the set of the public keys $pub_{A,1}$, $pub_{A,2}$, ..., $pub_{A,i}$ stored in the key memory 17, which public keys are each associated with a connectable memory module $SM_1$, $SM_2$, ..., $SM_i$, can be modified, for example, to authorize the data processing device 1 for use with different memory modules 20 each with different programs 27 for different missions. For this purpose, the public key $pub_M$ of a master key pair 24 is optionally stored in a specially protected part of the device 1, particularly the Trusted Platform Module 18. The associated private key $priv_M$ of the master key pair 24 is stored in an administrator terminal 21. When the administrator terminal 21 is connected to the interface 16, the microcontroller 15 can receive a signature 28 of the administrator terminal 21 generated using the private key $priv_M$ of the administrator terminal 21 and verify said signature with the aid of the public key $pub_M$ of the master key pair 24 stored in the Trusted Platform Module 18. In the event of verification, the microcontroller 15 allows a list 29 having one or more new or updated public keys $pub_{A,i}$ to be received from the administrator terminal 21 and stored in the key memory 17 instead of or in addition to the public keys $pub_{A,i}$ already present there. The data processing device 1 can thus be configured, with the aid of the administrator terminal 21, for use with a wide variety of memory modules 20 that are also only temporarily valid.

The private key(s) $priv_{B,1}$, $priv_{B,2}$, ..., $priv_{B,j}$ stored in the key memory 17 can also be modified in the same way.

As a further security measure against malfunctions or tampering with the data processing device 1, the power supply 10 can be provided with a power failure detector 30, which activates the microcontroller 15 to clear the key memory 17 in the event of a failure or disruption of the power supply 10. As a result, there are no longer any public keys $pub_{A,i}$ stored in the key memory 17 for authenticating connected memory modules 20. Optionally, when the power failure detector 30 activates, the microcontroller 15 can also delete the public key $pub_M$ of the master key pair 24 in the Trusted Platform Module 18, whereby the data processing device 1 can no longer be configured with the aid of the administrator terminal 21 via the interface 16 and is thus made unusable. In addition, part or the entire program in the microcontroller 15 could also be deleted.

A similar "emergency deletion function" for the key memory 17 and/or the Trusted Platform Module 18 can also be brought about with the aid of a switch 31 which can be actuated by the user and which is accessible from the outside of the housing 2.

As an additional security measure, the housing 2 can be equipped with a tampering sensor 32. The tampering sensor 32 detects tampering on or in the housing 2, for example, opening, damage, shaking, overheating, overcooling, irradiation or sonication, etc., and then causes the microcontroller 15 to switch off the switches 12, 13 and/or trigger the aforementioned emergency deletion function. Such a tampering sensor 32 can be, for example: a switching contact which closes or opens when the housing 2 is opened and signals said activation to the microcontroller 15; a resistance measuring device, which monitors the electrical resistance of the housing wall of the housing 2, for example, between electrodes that are distributed over the wall of the housing 2, or in a grid of conductive ink, wires, etc., to detect fissures or cracks in the housing 2 based on changes in resistance; a microphone for the interior of the housing 2, which microphone detects structural changes in the housing 2 based on a change in the sound transmission or reflection behavior of the housing interior; a solid-borne sound monitoring device, which detects such structural changes based on the sound transmission or resonance behavior of the solid-state structure of the housing 2 and its components mounted therein for sound or ultrasonic waves introduced therein; other types of light or sound detectors in or on the housing 2, which, for example, detect an opening of the housing 2 due to the penetration of light or sound into the housing 2; cameras which are directed into the interior of the housing or outwards in order to detect tampering on or in the housing 2; etc.

The microcontroller 15 can be programmed so that when the tampering sensor 32 activates, it clears the key memory 17 and/or the Trusted Platform Module 18 in order to prevent further use of a data processing device 1 that has been tampered with or to make it completely unusable.

The disclosed subject matter is not restricted to the illustrated embodiments, but rather encompasses all variants, modifications and combinations thereof which fall within the scope of the attached claims.

What is claimed is:

1. A data processing device, comprising a housing in which are arranged a processor, a program memory connected to the processor and at least one hardware component connected to the processor via a data line and supplied with power via a power supply line and a microcontroller arranged in the housing and having an interface and a persistent key memory in which a public key of a first public/private key pair is stored, wherein a switch controlled by the microcontroller is interposed in the data line, and wherein the microcontroller is configured to receive a signature, generated using the private key of the first key pair, of a memory module detachably connected to the interface via the interface, to verify the signature using the public key of the first key pair, and to switch on the switch in the case of verification.

2. The data processing device according to claim 1, wherein a further switch controlled by the microcontroller is interposed in the power supply line, wherein the microcontroller is further configured to also switch on the further switch in the case of verification.

3. The data processing device according to claim 1, wherein the microcontroller is configured to load a program from the memory module via the interface in the case of verification.

4. The data processing device according to claim 3, wherein the private key of a second public/private key pair is stored in the key memory and the microcontroller is configured to load a program encrypted using the public key of the second key pair or data encrypted in this way via the interface, to decrypt the program or data, respectively, using the private key of the second key pair, and to supply the program or data, respectively, to the processor for storage in the program memory or the hardware component.

5. The data processing device according to of claim 1, wherein the public key of a public/private key master key pair is stored in a Trusted Platform Module of the microcontroller and,
   wherein the microcontroller is configured to receive a public key signed using the private of the master key pair via the interface, to verify the signature thereof using the public key of the master key pair and, in the case of verification, to store the received public key in the key memory.

6. The data processing device according to any one of claims 1, wherein the or at least one of the hardware component/s is a persistent mass storage device.

7. The data processing device according to claim 1, wherein the or at least one of the hardware component/s is a radio interface module.

8. The data processing device according to claim 1, wherein the or at least one of the hardware component/s is a camera or an environmental sensor.

9. The data processing device according to claim 1, wherein the interface is a wirebound interface.

10. The data processing device according to claim 9, wherein the interface is a USB interface.

11. The data processing device according to claims 1, wherein the housing is equipped with a tampering sensor connected to the microcontroller and the microcontroller is configured to switch off the switch when the tampering sensor activates.

12. The data processing device according to claim 2, wherein characterized in that the housing is equipped with a tampering sensor connected to the microcontroller and the microcontroller is configured to switch off the further switch when the tampering sensor activates.

13. The data processing device according to claim 11, wherein the microcontroller is further configured to clear the key memory when the tampering sensor activates.

14. The data processing device according to claim 1, wherein said data processing device is equipped with a power failure detector connected to the microcontroller and the microcontroller is configured to clear the key memory when the power failure detector activates.

15. The data processing device according to claim 5,
   wherein the public key of a public/private key master key pair is stored in a Trusted Platform Module of the microcontroller,
   wherein the microcontroller is configured to receive a public key signed using the private key of the master key pair via the interface, to verify the signature thereof using the public key of the master key pair and, in the case of verification, to store the received public key in the key memory, and wherein the microcontroller is further configured to delete the public key of the master key pair in the Trusted Platform Module when the power failure detector activates.

\* \* \* \* \*